United States Patent [19]

Dighe et al.

[11] Patent Number: 4,998,486
[45] Date of Patent: Mar. 12, 1991

[54] PROCESS AND APPARATUS FOR TREATMENT OF EXCAVATED LANDFILL MATERIAL IN A PLASMA FIRED CUPOLA

[75] Inventors: Shyam V. Dighe, North Huntingdon; Raymond F. Taylor, Jr., Irwin; Robert J. Steffen, Whitehall; David M. Rohaus, Jeannette, all of Pa.

[73] Assignee: Westinghouse Electric Corp., Pittsburgh, Pa.

[21] Appl. No.: 343,694

[22] Filed: Apr. 27, 1989

[51] Int. Cl.[5] ............................. F23G 5/00; F23G 5/12
[52] U.S. Cl. ..................................... 110/346; 110/236; 110/256; 373/18; 422/129
[58] Field of Search ............... 110/236, 250, 346, 256; 373/18, 19; 422/129

[56] References Cited

U.S. PATENT DOCUMENTS

| | | | |
|---|---|---|---|
| 3,729,298 | 4/1923 | Anderson | 110/236 X |
| 4,508,040 | 4/1985 | Santén et al. | 110/345 X |
| 4,530,101 | 7/1985 | Fey et al. | |
| 4,718,362 | 1/1988 | Santén et al. | 110/346 |
| 4,761,793 | 8/1988 | Dighe et al. | |
| 4,769,065 | 9/1988 | Dighe et al. | |
| 4,780,130 | 10/1988 | Dighe et al. | |
| 4,780,132 | 10/1988 | Dighe et al. | |
| 4,831,944 | 5/1989 | Durand et al. | 110/346 |

Primary Examiner—Edward G. Favors
Attorney, Agent, or Firm—G. H. Telfer

[57] ABSTRACT

Excavatged landfill material is treated in a plasma fired cupola in a process wherein hazardous material such as PCB's are volatilized and consumed in an afterburner above the cupola and hazardous materials containing heavy metals are fixed in vitreous material made molten within the cupola and resulting in a non-leachable solid product.

28 Claims, 3 Drawing Sheets

PROCESS AND APPARATUS FOR TREATMENT OF EXCAVATED LANDFILL MATERIAL IN A PLASMA FIRED CUPOLA

BACKGROUND AND SUMMARY OF THE INVENTION

The invention relates to treating materials so that hazardous and toxic materials contained in them are either destroyed or made safe.

Landfills have in the past been collection sites for a wide variety of discarded objects and materials. Some contain substantial levels of toxic and hazardous chemicals whose clean-up is being required by government regulation. Of concern are, for example, materials containing heavy metals such as lead, nickel and chromium or toxic halogen containing chemicals such as polychlorinated biphenyls (PCB's).

For convenience, excavated landfill material will be referred to as ELM.

Incineration processes have been used or proposed to treat the ELM by burning it along with other combustible material, typically municipal garbage. Such incineration processes are feasible but may involve large flow rates of potentially harmful materials and the incinerator ash that results as an end product may not be environmentally benign; potential for leaching of toxic heavy metals may still exist.

One type of system for treating ELM is a pyrolyzer such as that disclosed in copending application Ser. No. 027,775, filed Mar. 18, 1987 by Levin and assigned to the present assignee. Such a pyrolyzer produces vitreous, i.e., glass like, material by electrical heating in a chamber operated in a substantially closed or pyrolytic manner. Such a system incurs high energy costs which it is desirable to minimize It is however successful in producing vitrified material in which the heavy metals can be trapped in the glass matrix of the slag.

A plasma fired cupola is a known apparatus previously disclosed for such purposes as metal recovery as in Fey et al. U.S. Pat. No. 4,530,101, July 16, 1985; Dighe et al., "Plasma Fired Cupola and Innovation In Iron Foundry Melting", AFS transaction paper, 1986; Dighe et al. U.S. Pat. No. 4,761,793, Aug. 2, 1988; U.S. Pat. No. 4,780,132, Oct. 25, 1988; and U.S. Pat. No. 4,769,065, Sept. 6, 1988; and copending applications Ser. No. 047,808, filed May 8, 1987, now U.S. Pat. No. 4,828,607 issued May 9, 1989, and Ser. No. 212,851, filed June 29, 1988, now U.S. Pat. No. 4,853,033 issued Aug. 1, 1989 by Dighe et al. and Ser. No. 226,712, filed Aug. 1, 1988, now U.S. Pat. No. 4,889,556 issued Dec. 26, 1989 by Dighe, all assigned to the present assignee. The foregoing descriptions are incorporated herein by reference for general information on the structure and operation of plasma fired cupolas.

Cupolas, not plasma-fired, are presently known for metal and mineral melting that utilize a shaft with coke and blown air, sometimes enriched with oxygen, through tuyeres near the bottom. These units require such amounts of air that fine particles of charged material and even, in some instances, vitrified material, may be blown upward. Additionally, they normally achieve maximum temperatures of only about 3000° F.

Among the purposes of the present invention are to provide an effective and economical treatment for excavated landfill material (ELM) containing toxic and hazardous materials. In the process of the present invention, a plasma fired cupola is used for treatment of ELM. The cupola is a vertical shaft with a charge door proximate the top thereof. A plasma torch is provided and located in a tuyere proximate the bottom of the cupola and the plasma torch has a feed nozzle. The plasma torch is electrically energized and produces a plasma from air. Air is fed through the nozzle and is heated to a high temperature by the plasma torch and supplied into the cupola.

In starting operation of the system, the cupola is partly filled with a carbonaceous fuel, such as coke or a mixture of coke and coal, which is ignited. When adequate operating temperature is reached, the charge material is feed through the charge door. The ELM is normally supplied along with reactive agents such as additional coke and a fluxing agent, such as limestone.

Conditions are maintained for melting the ELM in the cupola to form a vitreous slag. In addition, metal supplied with the ELM, such as iron and copper, becomes molten and will separate from the slag gravimetrically. The coke reduces oxides of such metals to yield the metal itself. The cupola is tapped to take out the vitreous slag and the molten metal.

The off gases from the cupola are allowed to rise to an afterburner located above the cupola for destruction of any toxic and hazardous materials contained in the off gases. The vitreous slag from the cupola is allowed to cool and produce non-hazardous solid material from which heavy metals such as chromium, lead and nickel, occurring as oxides, are substantially non-leachable.

In accordance with the present invention, preferably about 6% of a charge is fuel. The fuel is sufficient to supply all of the combustion gases for the afterburner in which PCB's or the like are burned.

A layering technique is employed for the material supplied into the cupola through the charge door. That is, a distinct layer of fuel is provided between layers of limestone, ELM or mixtures thereof. The layering helps reduce back pressure in the system. The gas flow rate is reduced to a lower level than that employed for foundry melting, such as preferably about 0.6 cubic feet per minute per square inch of cupola cross-section as compared to about 0.9 cubic feet per minute. Further, the amount of limestone supplied is adjustable for optimizing the basicity of the slag to achieve a desired flow rate.

These and other aspects of the invention will become better understood from the description hereinafter

DRAWINGS

PREFERRED EMBODIMENTS

Figure 1:
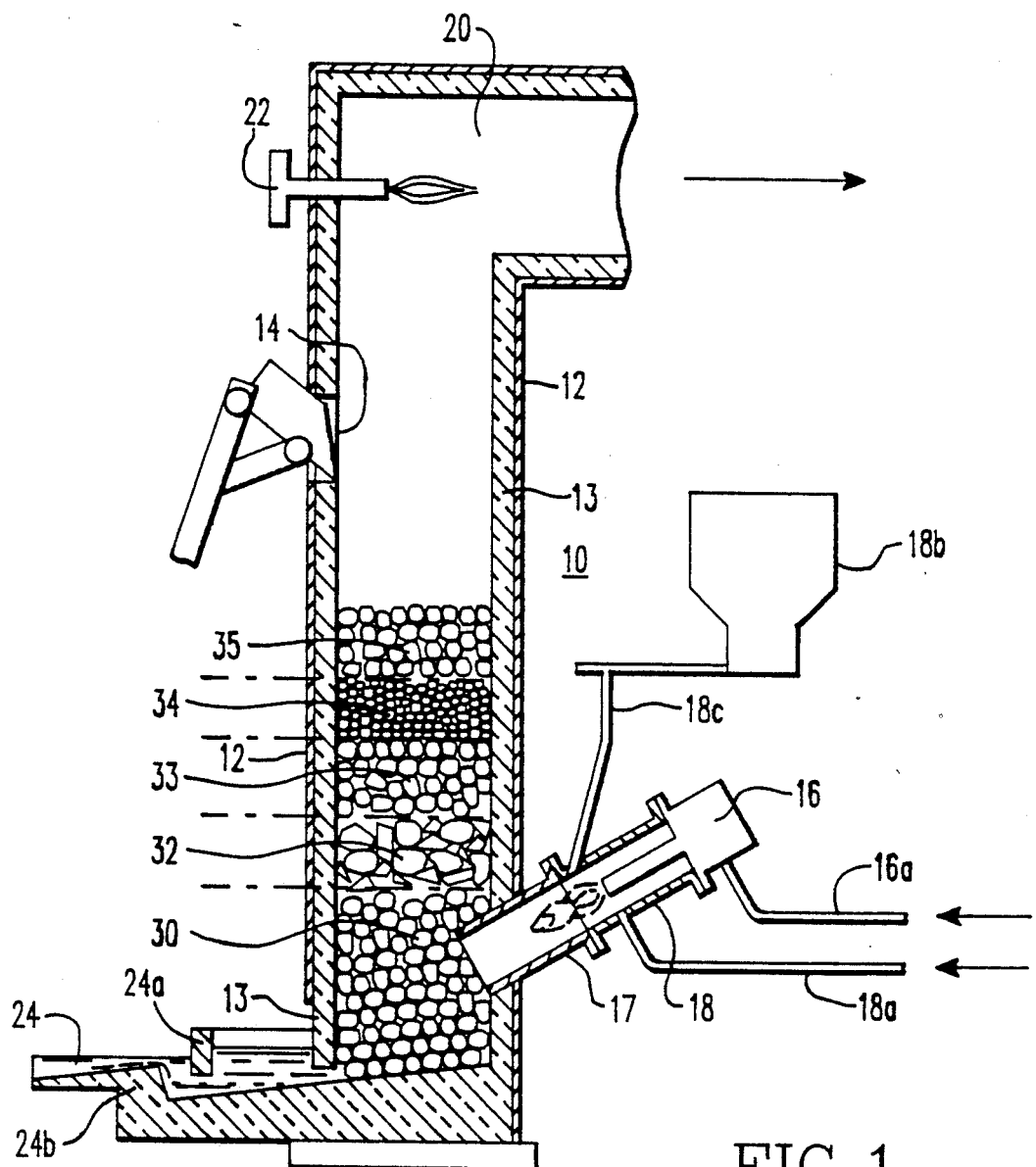
FIG. 1 is a schematic diagram of an example of a plasma-fired cupola used in the practice of the present invention.

FIG. 1 illustrates a plasma fired cupola 10 for use in the practice of the present invention which bears many common aspects to the apparatus employed for the iron foundry melting and recycling of steel belted tires described in the above referred to sources. The cupola itself is a vertical shaft 12 with a refractory lining 13. In the vertically upward part of the cupola 12 is a charge door 14 for charging excavated landfill material (ELM) as well as reactive agents such as a carbonaceous fuel which may be coke or a mixture of coke and coal, normally the latter, and a fluxing agent such as limestone. Air also enters through the charge door 14.

Proximate the bottom of the cupola 12 are disposed plasma torches 16 each within a tuyere 17 extending into the cupola and having a shroud nozzle 18. Each torch 16 is supplied with a gas such as air through line 16a that is introduced in an arc between energized, spaced, electrodes to be ionized and form a plasma. Blast air tangentially enters just in front of the torch 16 through line 18a and nozzle 18. The blast air is added to the plasma and is heated and then enters into the cupola 12 in its heated state. The air entering through line 18a may be at ambient temperature or preheated up to about 1200° F.

Above the cupola 12 is an afterburner chamber 20 into which the off gases from the cupola 12 rise. The afterburner is provided with a stack igniter 22 but it is not necessary to supply fuel in addition to the off gases themselves.

The ELM can be fed directly into the charge door 14 such as by using a skip bucket carried by a skip hoist or by a feeder belt. The ELM does not have to be preprocessed to any appreciable degree in terms of sizing or drying and is generally used on an as received basis. The cupola shaft diameter is sized to accept the biggest size of ELM which might, for example, be an engine block or refrigerator. In other respects, it is of course suitable if desired to subject the ELM to a pretreatment through a shredder or the like to reduce the size of individual pieces; preferably the cupola is designed so that this is not necessary. An economical mix of coke and coal is also fed into the skip bucket which is then elevated and dumped into the charge door by means of a skip hoist.

In general, coke is the preferred fuel and reducing agent and will be referred to herein. As opposed to coal, it provides more firm support for the other solid materials added in a charge and ensures adequate gas flow. For economy, varying amounts of coal may be mixed with the coke. In general, the fuel should be at least about 25% coke.

In start-up, the cupola 12 filled with coke up to several inches above tuyere 17. The coke bed 30 is ignited by the plasma heated air which is fed at the bottom of the cupola through the tuyere 17. When the coke bed is burning and the cupola refractory is sufficiently heated, the charge material consisting of ELM, coke (which may include some coal), and the fluxing agent is fed through the charge door. This system start-up normally takes only about 2 to 3 hours. The coke, besides providing the energy of combustion, also provides a porous matrix inside the cupola shaft so that the ELM does not form a mat and cause plugging. Also both coal and coke provide carbon monoxide to the off gas which upon ignition in the afterburner completely destroys the PCB's. No supplemental fuel is required to provide heat in the afterburner 20. However, if a fuel such as natural gas is readily available and economical it may be burned to supply heat and allow a corresponding reduction in the amount of coke in the cupola.

The ELM, as it travels down the cupola shaft 12, is first heated by the hot gases rising from the melt zone at the bottom of the cupola. This countercurrent heat exchange is one of the primary reasons for the energy efficiency of the plasma fired cupola. The PCB's are evaporated from the ELM and exit the cupola along with the other off gases, typically CO, $CO_2$, $N_2$.

The top gases rise to the afterburner unit 20 where they are mixed with the combustion air entering through the charge door 14 and ignited by the stack igniter 22 to produce sufficient temperature for destruction of PCB's. The standard requirement is that such materials be subjected to a temperature of at least about 2200° F. for a time of at least about 2 seconds and these conditions can be adequately, readily met in the present process.

Upon traveling down the cupola shaft 12, the ELM enters the melt zone (in coke bed 30 proximate to and above tuyere 17) where the temperatures are in the range of from about 3000° F to about 4500° F. All constituents of the ELM melt at this temperature and form a vitreous slag plus the metallic portion of the ELM that also melts.

The temperature and chemistry of the melt zone are controlled (by air and coke supplied) to achieve desired performance. In general, most oxides, e.g., iron and copper, are reduced to provide the metal itself in a molten state. The heavy metal oxides of metals such as chromium and nickel may not be reduced but instead are dissolved in the slag. Some metals, such as zinc and lead, are likely to have their oxides reduced and the metals vaporized. Such latter metals are reoxidized in the afterburner 20 and will be collected from the afterburner discharge The plasma torch power is preferably adjusted so that silica ($SiO_2$), contained within the ELM is reduced to produce silicon. The silicon dissolves in the molten metal and forms, with molten iron, a useful and valuable ferrous alloy that can be sold on the foundry market. The vitrified ELM and the metal is continuously tapped through a spout 24 at the bottom of the cupola using a skimmer 24a and dam 24b arrangement. The molten stream from the spout 24 is about 2500°-2800° F. The slag is separated from the metal by this arrangement to produce blocks of slag and metal ingots.

Figure 2:
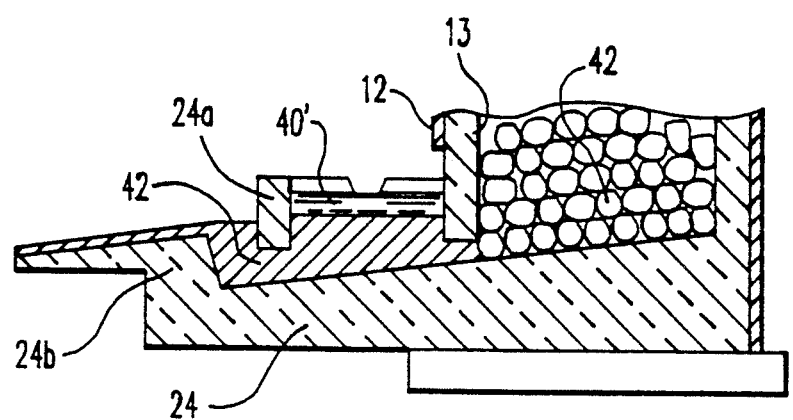
FIG. 2 is an enlarged view of the spout portion of the plasma fired cupola of FIG. 1.

FIG. 2 shows an enlarged view of a spout 24. Molten slag 40 and molten metal 42 collect at the bottom of the cupola shaft 12. On the outside of the cupola the lighter slag 40' is confined by a skimmer 24a and is tapped off.

The heavier metal flows under the skimmer 24a and over the dam 24b into whatever mold collects it. The instances where fly ash or the like is injected into the slag it would be introduced into the slag 40'.

The gases exiting the afterburner 20 may be exhausted to the atmosphere, preferably only after going through a scrubber or other air pollution control equipment with collection of flyash.

According to an optional form of the invention, the hot combustion gases exiting the afterburner 20 are sent to a recuperator to preheat the blast air and also the combustion air of the afterburner. According to another optional form of the invention, the hot gases from the afterburner are sent to a boiler to generate steam which may be used for process requirements or to generate power.

Still a further variation is to supply fine waste material, such as fly ash from the afterburner 20 or elsewhere, such as utility boilers and incinerators, through the nozzle 18 installed in the tuyere region at the base of the cupola. Bin 18b and line 18c is shown for this purpose. This material is simultaneously vitrified along with the ELM for convenient disposal. In addition or alternatively, flyash containing, for example, oxides of lead or zinc, may be fed directly into the molten slag at the bottom of the cupola 12 proximate the spout 24 or in the spout itself before the material solidifies. This helps to ensure such oxides are dissolved in the slag for safe disposal.

While using the apparatus for the process for treatment of ELM, it is also possible to add other waste material, both combustible and non-combustible through the charge door. The plasma fired cupola is a flexible apparatus suitable for use with a wide range of feed compositions.

The fuel supplied with a charge of ELM provides carbon to produce sufficient amounts of carbon monoxide to serve as the fuel in the afterburner 20 for assured destruction of PCB's and the like. For this purpose it is preferred that the carbon fuel (coke) in the charge make up about 6% or more, by weight, of the process material supplied into the cupola.

It has been found desirable for the ELM, the coke or other carbonaceous fuel, and the limestone or other fluxing agent to be layered rather than mixed in the cupola in order to reduce back pressure. For example, after initially starting operation with coke 30 supplied in the cupola, a first layer of ELM 32 can be fed into the cupola, followed by a coke layer 33, then a limestone layer 34 followed by a coke layer 35. Then the sequence may be repeated up to near the charge door 14. A coke layer separates layers of the ELM and limestone materials, which may, if desired, be mixed together in a single layer.

For improved operation of the plasma fired cupola for treating ELM the coke (or carbon fuel) bed height is well regulated. The initial coke charge 30 fills the cupola up to a level above the tuyere 17 (essentially a hollow tube) through which the blast air heated by the torch 16 enters the cupola. A level of about five inches to about 10 inches above the top of the tuyere 17 is normally preferred to give a desirable ratio of CO to $CO_2$.

Greater depths, in the range up to about three feet above the tuyere 17, for charge 30 are suitable if the intent is to produce grater quantities of CO for use as fuel in the afterburner 20. The process that occurs is that the blast air enters the cupola and reacts with the coke in an exothermic reaction to form largely $CO_2$. The $CP_2$, if exposed to reducing effects of more coke in a relatively greater depth of coke, will react to form CO in an endothermic reaction: $CO_2 \rightarrow 2CO$, called the Boudard reaction. Therefore, the available choices involve operating in a range from maximizing the heat produced in the coke bed by using a coke charge sufficient for high $CO_2$ off gas production to maximizing the CO available in the afterburner by use of increased coke.

The initial coke bed height is maintained, with normal variations up and down, around that level of the charge material.

It is suitable and preferred to employ a range of from about 6% to about 25% of carbon bearing fuel and about 10% to about 45% of limestone relative to the total charge of supplied material in the cupola. The coke ratio blast rate and torch power is adjusted based on melt rate requirement such that the $CO/CO_2$ molar ratio in the top gas is in the range of 0.2 to 3.0.

The amount of limestone is preferably adjusted for optimum basicity to yield good flow characteristics in the slag at the moderate temperatures which are easily attained. Basicity is defined as the ratio:

$$\frac{CaO\% + MgO\%}{SiO_2\% + Al_2O_3\%}$$

At a value below about 0.3 the slag is highly viscous and flows very slowly. Above about 0.7, the slag very friable so it serves less well a an encapsulator of hazardous materials that may be contained in it. Therefore, it is preferred to have a basicity within the range from about 0.3 to about 0.7.

The gas flow rate (through 18) is reduced to an even lower level than the case of foundry melting for awarding slag elutriation in the melt zone. The flow rate in the cupola is about 0.5 cubic feet per minute (per sq. in. of cupola cross-section) or less and preferably about 0.2 to about 1.0.

Figure 3:
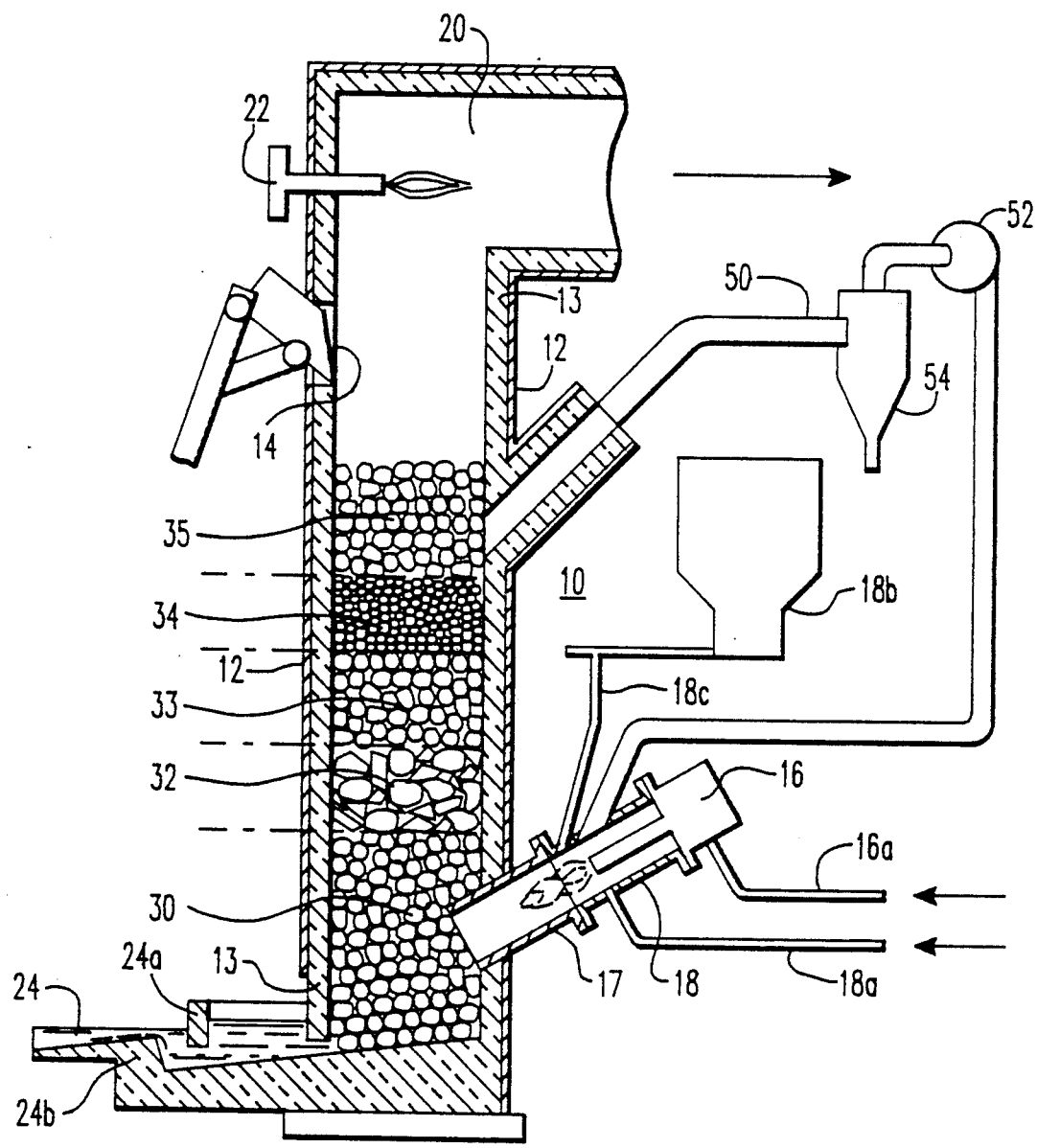
FIG. 3 is a plasma fired cupola with a recycle loop for gases produced.

In FIG. 3, the system of FIG. 1 is shown with the addition of a recycle loop 50 that includes a draft fan 52 for recycling some of the off gases from the cupola 12 back to the torch nozzle 18. The recycle loop 50 also includes a trap 54 for particles (fly ash) that can be reinjected through bin 18b or can be injected into the slag, in addition to other forms of disposition.

The recycle loop 50 is an option that is more beneficial if the ELM contains relatively larger quantities of oxides of valuable metals desired to be recovered. Oxides in the charge tend to be reduced by the carbon fuel but if excess air is present the reaction will tend to reverse and reform the metal oxides. To create a more strongly reducing atmosphere one may draw off some of CO and N and have it re-enter the nozzle to lower the relative amount of oxygen. Typically the gases exiting the cupola are at about 800° F. and re-enter at about 200° F. The recycled off gases help promote the reduction reaction while permitting use of less coke than may be necessary if it alone were counted on to take care of the oxygen in the blast air.

Figure 4:
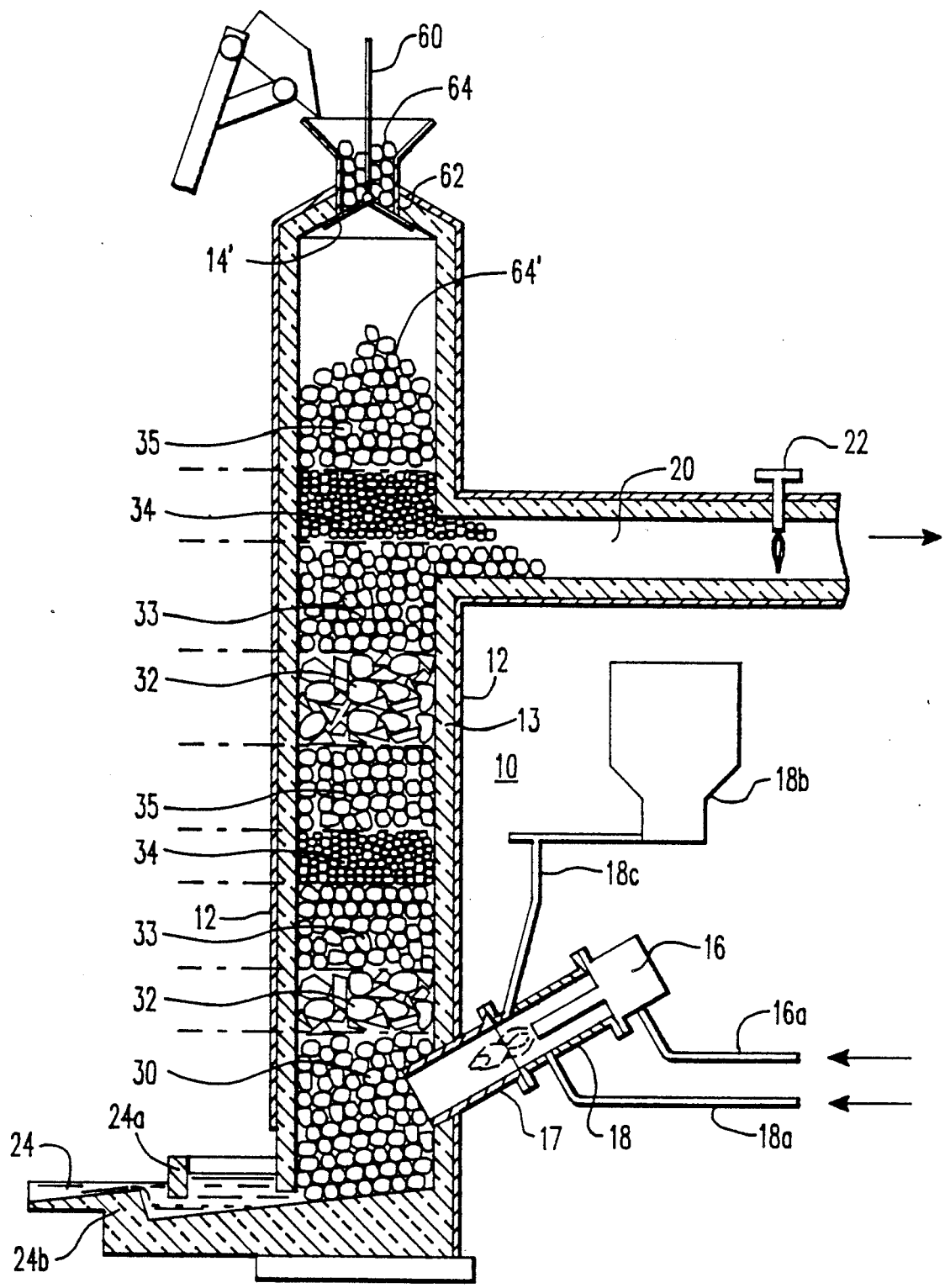
FIG. 4 is a modified plasma fired cupola in accordance with a further embodiment of the invention.

FIG. 4 shows a further variation referred to as a plasma-fired cupola with a "below charge take-off". As compared with FIG. 1, the top of the cupola 12 is changed so the afterburner 20 receives off gases from a point below the charge level. A fan and air pollution control equipment, not shown, would be provided after the afterburner.

In FIG. 4, a charge door 14' is provided at the top that minimizes air entry. The door 14' is supported by a hoist cable 60 that in the closed position holds the door 14' against the door frame 62. A charge 64 of material is applied on the upper surface of the door. When the door is lowered, the material enters the cupola and becomes part of charge 64' which extends up past the gas take-off. The door 14' can be promptly closed so a highly reducing atmosphere is maintained.

The table below gives examples of representative ELM compositions and other conditions for their treatment in the plasma fired cupola substantially in accordance with FIG. 1, for example. Example I has been actually performed and verified to process the material into a stream of lag and a stream of metal, essentially a ferrous alloy containing about 4% silicon. The off gases produced afterburner temperatures in excess of 2200° F. $CO/CO_2$

| No. | Item | EXAMPLES | | |
|---|---|---|---|---|
| | | I | II | III |
| 1. | ELM Charge Mix (weight %) | | | |
| | Glass % | 31.3 | 20 | 20 |
| | Steel % | 26.3 | 24 | 20 |

-continued

| No. | Item | EXAMPLES | | |
|---|---|---|---|---|
| | | I | II | III |
| | Bricks % | 6.3 | 7 | 7 |
| | Concrete % | 6.3 | 7 | 7 |
| | Rocks % | 6.3 | 7 | 7 |
| | Ash % | 6.3 | 7 | 7 |
| | Clay % | 6.3 | 7 | 7 |
| | Wood % | 6.1 | 5 | 4 |
| | Industrial Elec. Hardware % | 2.9 | 10 | 15 |
| | Copper % | 1.0 | 1 | 1 |
| | Tires % | 0.9 | 5 | 5 |
| 2. | Carbonaceous Fuel (% of ELM Charge) | | | |
| | Coke % | 8.0 | 4 | 3 |
| | Coal % | — | 4 | 3 |
| 3. | Limestone (% of ELM Charge) | 37.0 | 30 | 20 |
| 4a. | Blast Rate Scf/min/t/hr | 275 | 300 | 300 |
| 4b. | Blast Rate Scf/min/in$^2$cupola | 0.33 | 0.37 | 0.37 |
| 5. | Torch Power Kw/ton/hr | 620 | 600 | 550 |
| 6. | Co/CO2 Ratio | 1.0 | 1.0 | 0.7 |

Various other changes may be made consistent wit the general teachings hereof.

We claim:

1. A process for treatment of excavated landfill material contaminated with toxic and hazardous substances comprising:
   providing a plasma-fired cupola having a vertical shaft cupola with an upwardly located charge door and a plasma torch located proximate the bottom of said cupola;
   heating air to a high temperature by said plasma torch and supplying the heated air into said cupola;
   forming a bed of carbonaceous fuel in said cupola heated to combustion by the heated air;
   supplying excavated landfill material and reactive agents through said charge door of said cupola, said reactive agents comprising additional carbonaceous fuel;
   melting the excavated landfill material in the cupola to form a vitreous slag;
   tapping the cupola to take out vitreous slag;
   drawing off-gases from said cupola to an afterburner for destruction of any volatile toxic and hazardous materials contained in the off-gas;
   allowing vitreous slag from the cupola to cool and produce non-hazardous solid material.

2. A process in accordance with claim 1 wherein: said carbonaceous material comprises coke.

3. A process in accordance with claim 2 wherein: said carbonaceous material comprises a mixture of coal and coke.

4. A process in accordance with claim 2 wherein: said coke provides a degree of porosity to the material in the cupola to allow gas flow therethrough and solidity to support additionally added excavated landfill material.

5. A process in accordance with claim 1 wherein: said carbonaceous fuel results in formation of carbon monoxide sufficient to fuel the afterburner.

6. A process in accordance with claim 5 wherein: the afterburner attains a temperature sufficient for the off-gas to be exposed to a temperature of at least about 2200° F. for a time of at least about 2 seconds for satisfactory destruction of any PCB's therein.

7. A process in accordance with claim 1 wherein: said reactive agents further comprise a fluxing agent.

8. A process in accordance with claim 7 wherein: the fluxing agent supplied is limestone.

9. A process in accordance with claim 1, wherein: the plasma torch supplies sufficient heated air into said cupola for producing a melt zone having a temperature of at least about 3000° F. to about 4000° F.

10. A process in accordance with claim 1, wherein: the melting of the excavated landfill material forms molten metal in addition to vitreous slag.

11. A process in accordance with claim 10 wherein: the excavated landfill material includes one or more silicon compounds that are reduced within the cupola a provide silicon dissolved in the melted metal, thus forming a ferro-silicon alloy.

12. A process in accordance with claim 10, wherein, the process further includes tapping the cupola to derive molten metal and vitreous slag therefrom, the cupola having a spout with a skimmer and dam for such tapping.

13. A process in accordance with claim 1 wherein: hot combustion gases exiting the afterburner are supplied to a heat exchanger to heat a fluid used in the process for treatment of excavated landfill material or for another process.

14. A process in accordance with claim 1 wherein: in addition to air, a fine waste material is introduced in the nozzle and is vitrified in the cupola along with the excavated landfill material 15. A process in accordance with claim 1 wherein: additional waste material is supplied through the charge door of the cupola in addition to the landfill material and the reactive agents.

16. A process in accordance with claim 1 wherein: the additional carbonaceous fuel supplied along with excavated landfill material is in an amount of at least about 6% of the total charge in order to provide sufficient carbon to produce carbon monoxide utilized as fuel in the afterburner.

17. A process in accordance with claim 1 wherein: said supplying of landfill material and reactive agents is performed in a manner to provide separate or distinct layers of landfill material and reactive agents.

18. A process in accordance with claim 17 wherein: said reactive agents include coke and limestone which are supplied along with landfill material to provide alternate layers of said materials in a sequence such that a layer of coke is provided to separate layers of other materials.

19. A process in accordance with claim 1 wherein: gas flow in the cupola is controlled to a level of about 0.6 cubic feet per minute or less.

20. A process in accordance with claim 7 wherein: the amount of fluxing agent provided is controlled to produce a basicity in the vitrified slag of about 0.3 to about 0.7.

21. A process for treating excavated landfill material in a plasma-fired cupola for safe disposition of toxic or hazardous chemicals such as PCB's and heavy metals, comprising:
   providing a hot bed of carbon fuel in a cupola to a level above and proximate a tuyere from which plasma heated air enters the cupola to form a melt zone near the top of the hot bed at a temperature of from about 3000° F. to about 4500° F. and evolving carbon monoxide;
   feeding a charge of excavated landfill material, fluxing agent and additional carbon fuel onto the hot bed to evolve material that vaporizes at the melt zone temperature including any PCB's therein, to reduce compounds of one or more metals of the group of iron, copper, zinc and lead and without reducing compounds of any metals of the group of chromium and nickel, and to produce molten metal and vitreous slag.

22. A process according to claim 21 wherein:
the evolved vapors and carbon monoxide are allowed to rise to an afterburner where conditions produce combustion and exposure of the vapors to a temperature of at least about 2200° F. for a time of at least about 2 seconds.

23. A process according to claim 22 wherein:
unreduced compounds of metals are dissolved in the vitreous slag.

24. A process according to claim 23 wherein:
the molten metal includes metal resulting from the reduction of compounds of metals from the group including iron and copper.

25. A process according to claim 21 wherein:
conditions in the melt zone are such to reduce compounds of silicon and to yield silicon which forms part of the molten metal.

26. A process according to claim 21 wherein:
reduction of compounds of metals from the group consisting of zinc, cadmium and lead in the melt zone results in vaporization of such metals which rise with other evolved vapors and carbon monoxide to an afterburner to where oxides of such metals are formed and are subsequently collected.

27. A process according to claim 21 wherein the oxides in the flyash are injected back into the slag phase for dissolution in the slag.

28. A plasma-fired cupola system arranged for treatment of excavated landfill material comprising:
a vertical shaft;
a tuyere proximate the bottom of said shaft;
at least one plasma torch and a shroud nozzle arranged colinearly with said tuyere;
air feed lines into said plasma torch and said shroud nozzle respectively;
means to energize said plasma torch and produce a plasma of the air supplied therein which then heats air supplied in said nozzle;
a bed of carbon fuel comprising at least about 25% coke in said shaft extending from the bottom thereof to a level proximate to and above said tuyere;
a charge door located in the upward part of said shaft;
said shaft containing a charge material on said bed of carbon fuel, said charge material comprising excavated landfill material, additional carbon fuel, and a fluxing agent;
said shaft having an afterburner chamber in its uppermost region with a stack igniter therein, said charge material on said bed of carbon fuel producing off-gases burned in said afterburner;
said shaft having a spout in its lowermost region for yielding molten slag and metal produced from said charge material.

* * * * *